Patented Apr. 29, 1947

2,419,718

UNITED STATES PATENT OFFICE 2,419,718

PRODUCTION OF DIARYL NITROSAMINES

Henry J. Kehe, Cuyahoga Falls, Ohio, assignor to The B. F. Goodrich Company, New York, N. Y., a corporation of New York No Drawing. Application June 3, 1944, Serial No. 538,707

4 Claims. (Cl. 260—576)

This invention relates to the preparation of aromatic nitrosamines and pertains more specifically to their preparation from secondary aromatic amines.

It has been proposed in the past to prepare these nitrosamines by dissolving the secondary aromatic amine in an organic solvent such as methyl or ethyl alcohol, acetone, or the like, adding hydrochloric acid, then adding an aqueous solution of sodium nitrite while maintaining the temperature of the reaction mixture below 20° C. It has been found essential to carry out this reaction at a low temperature because of the formation of by-products and the decomposition of the nitrosamines when the temperature is raised.

I have now discovered that in spite of the insolubility in water of the salts of secondary aromatic amines, the reaction may be carried out successfully in an aqueous medium at an elevated temperature in the presence of sulphuric acid rather than hydrochloric acid. Under these conditions, yields better than 99% of the theoretical yield may be obtained. The only losses appear to be the mechanical losses involved in separating the products from the reaction mixture. The advantages of my new process are the elimination of the relatively expensive organic solvent or of the necessity of recovering it from the reaction mixture, and the elimination of the expensive refrigeration equipment necessary to carry out the reaction of the prior art on a commercial scale, as well as a great improvement in the yield and in the purity of the product.

It has been found essential to maintain the temperature of the reaction mixture above the melting point of the organic materials present, that is, above the melting point of the secondary aromatic amine, and of the nitrosamine produced. During the course of the reaction, when both the amine and the nitrosamine are present in substantial quantities, the melting point of the eutectic mixture is considerably lower than that of either pure material so that the reaction temperature may be lowered during this period. Because of the fact that most nitrosamines tend to decompose at temperatures above about 150° C., it is preferred to employ my process only when the amine or the nitrosamine produced melts below that temperature. The process may be carried out at temperatures above 150° C. but in such cases the yield is frequently somewhat less than the theoretical amount because of decomposition of the product. When the required reaction temperature is below 100° C., the reaction may be and preferably is carried out at atmospheric pressure. When the required temperature is above 100° C., of course, it is necessary to carry out the reaction in an autoclave or other pressure equipment.

Although the concentration of the dilute aqueous sulphuric acid medium in which the reaction is carried out may be varied over a wide range, up to about 50% by weight, it has been found that best results are obtained by employing an acid concentration between about 5 and about 25% by weight. Although any water-soluble salt of nitrous acid may be employed for the purposes of the reaction, it is preferred to employ a salt, the cation of which forms a water-soluble sulfate in order to facilitate the separation of the nitrosamine from the reaction mixture. There may be used, for example, such materials as sodium nitrite, potassium nitrite, lithium nitrite, zinc nitrite, or the like. The concentration of the aqueous nitrite solution likewise may be varied over a wide range, up to the saturation point of the solution; it is usually most convenient to employ a solution having a concentration of about 10 to about 50% of nitrite by weight.

Among the large number of secondary aromatic amines which may be employed in my process are included diphenylamine, phenyl-alpha-naphthylamine, phenyl - beta - naphthylamine; nuclear-alkylated diphenylamines such as the di-tolylamines, the phenyltolylamines, etc.; phenyl-p-xenylamine, p-hydroxydiphenylamine, N,N'-diphenyl-p-phenylenediamine, 2,2,4-trimethyl-1,2 - dihydroquinoline, N,N'-diphenylethylenediamine, N-phenylbenzylamine, N-methylaniline, N-ethylaniline, and other similar compounds.

It has been found that practically quantitative yields of products are obtained using the theoretical quantity of reagents. However, an excess of sulphuric acid or of the nitrite may be employed without deleterious effect. An excess of the amine reactant is usually undesirable, of course, because it necessitates separation of the excess from the product.

The following specific examples are given, not as a limitation on my invention, but merely as an illustration of the process.

*Example I*

About 54.6 parts by weight of concentrated (93.2%) sulphuric acid and 455 parts by weight of water are mixed in a reaction vessel. To this aqueous solution of the acid there is added with heating and stirring about 169 parts by weight of diphenylamine. The temperature of the reaction mixture is raised to about 60 to 65° C., at which point the liquid diphenylamine is easily dispersed in the acid solution. A solution of 72 parts by weight of sodium nitrite (97% pure) in 168 parts of water is prepared, and, if necessary, filtered to remove insoluble foreign matter. When the dispersion of diphenylamine in acid has reached the correct temperature, the addition of the sodium nitrite solution is started below the surface of the reaction mixture. It is desirable to introduce the sodium nitrite as far below the surface as possible in order to provide the maximum time of contact of the nitrogen oxide with the other reagents. This solution is added over a period of about one hour. When the addition of the nitrite is about three-fourths complete, the temperature of the reaction should be gradually raised until at the end the temperature is about 70° C. The course of the reaction may conveniently be followed by determining the set point of the organic material; when it comes into the range of 63 to 64° C., the reaction is complete. If necessary, additional sulphuric acid and sodium nitrite may be added in order to bring the reaction to completion. Stirring is continued for 10 to 15 minutes after the addition of the nitrite is complete to aid in decomposing any excess nitrous acid and in driving it off as nitrogen oxide. Incomplete decomposition of nitrous acid leads to effervescence of the mixture and subsequent poor separation of the product from the reaction mixture.

Cessation of the stirring permits the mixture to separate into two phases, the lower one containing liquid diphenylnitrosamine and the upper one containing aqueous acid. The upper layer may then be removed by decantation, and the product may be washed with water and with dilute sodium carbonate solution, maintaining the temperature at 65 to 70° C. in order to prevent solidification of the nitrosamine. The purified product may then be run to a flaking machine or to cooling pans. There are obtained about 196 to 197 parts by weight of the product, which is so dry and free from oily impurities that it may be stored in paper bags or drums.

*Example II*

To a mixture of 25 parts by weight of concentrated (93.2%) sulphuric acid with about 208 parts of water there is added with stirring about 100 parts by weight of a mixture of nuclear-alkylated diphenylamines consisting of mono-, di-, and triheptyldiphenylamine. This material may be prepared, for example, by reacting heptene, or a mixture of isomeric heptenes, with diphenylamine in the presence of an acidic condensation catalyst such as aluminum chloride at a temperature of about 150° to 250° C. The preparation of materials of this type is described in Dunbrook Patent 2,180,936 issued Nov. 21, 1939.

Inasmuch as both the heptylated diphenylamines used and the nitrosamines produced from them are liquids at room temperature, it is not necessary to heat the reaction mixture in this case. A solution of 30.5 parts by weight of sodium nitrite (97% pure) in about 92 parts of water is prepared and is added slowly, with stirring, to the suspension of the heptyl diphenylamines in aqueous sulphuric acid, the nitrite solution being introduced below the surface of the reaction mixture as in Example I. The temperature of the reaction mixture is about 27° C. at the beginning of the reaction and rises, during the course of the addition of the nitrite solution, which requires about an hour, to about 38° C. because of the heat evolved by the reaction. Stirring is continued for 10 to 15 minutes after the addition of the nitrite solution is complete in order to decompose any excess nitrous acid. The aqueous acid layer is removed from the liquid product by decantation, and the product is washed with dilute sodium carbonate solution. The product is obtained in practically theoretical yield.

Other secondary aromatic amines may be prepared by a similar process; for example, 2,2,4-trimethyl-1,2-dihydroquinoline may be converted to the corresponding nitrosamine by my process using the same molecular proportions as in Example I. Since both the amine and the corresponding nitrosamine are liquids at room temperature, the process may be carried out at room temperature. Substantially the theoretical amount of product is obtained.

When phenyl-beta-naphthylamine is employed in my process, on the other hand, reaction is carried out in an autoclave at a temperature in the neighborhood of 110° to 120° C., at least at the beginning of the reaction, since the melting point of the amine is 108° C., while the melting point of the corresponding nitrosamine is about 95 C.

The required temperature for the process when other secondary aromatic amines are employed will be apparent from the melting points of the amines and nitrosamines involved. Although a batch process has been described in the specific examples, the process is readily adapted to continuous operation.

The particular order in which the reagents are mixed is not critical; for example, the amine may be suspended in water, and the sulphuric acid and solution of the nitrite may be added simultaneously to it; or the sulphuric acid may be added to a suspension of the amine in the aqueous nitrite solution; however, best results may be obtained by following the procedure described in the specific example.

It should be noted that the use of sulphuric acid is critical for the success of the process. When hydrochloric or other acid is used, it is found that considerable decomposition and discoloration of the products take place at elevated temperatures with consequent reduction in yield and purity of the product.

Although I have herein described specific embodiments of my invention, I do not intend to limit myself solely thereto, but to include all of the obvious variations and modifications falling within the spirit and scope of the appended claims.

I claim:

1. The method of producing an aromatic nitrosamine which comprises preparing a reaction mixture containing a secondary diaryl amine of the formula

where Ar is an aryl hydrocarbon radical having its valence on a nuclear carbon atom, suspended in an aqueous medium containing dissolved sulfuric acid in a concentration not greater than 50% by weight $H_2SO_4$ and a dissolved water-soluble salt of nitrous acid, agitating the reaction mixture while maintaining its temperature above that at which the suspended phase is liquid whereupon reaction occurs to form an aromatic nitrosamine suspended in the aqueous medium, and then separating the aromatic nitrosamine from the aqueous medium.

2. The method of claim 1 further characterized in that the diaryl amine is diphenyl amine.

3. The method of claim 1 further characterized in that the diaryl amine is a nuclear dialkylated diphenyl amine.

4. The method of producing diphenyl nitrosamine which comprises preparing a suspension of diphenyl amine in an aqueous solution of sulfuric acid having a concentration of 5 to 25% by weight $H_2SO_4$, adding to the suspension an aqueous solution of a water-soluble salt of nitrous acid while agitating the suspension and maintaining its temperature above that at which the suspended phase is liquid but below 100° C. whereupon reaction occurs to form diphenyl nitrosamine suspended in the aqueous medium, and then separating the diphenyl nitrosamine from the aqueous medium.

HENRY J. KEHE.

REFERENCES CITED

The following references are of record in the file of this patent:

UNITED STATES PATENTS

| Number | Name | Date |
|---|---|---|
| 1,643,428 | Tesche | Sept. 27, 1927 |
| 2,272,498 | Zerweck | Feb. 10, 1942 |

OTHER REFERENCES

Beilstein, Handbuch der Organische Chemie, vol. 12, pp. 583, 1308 (4th edition) (1929).

Beilstein, Handbuch der Organische Chemie, vol. 12 (supplement to 4th edition), p. 294 (1933).